July 6, 1943.  V. C. HEYBOURNE  2,323,600
DOCUMENT PHOTOGRAPHING CAMERA
Filed July 3, 1940  4 Sheets-Sheet 1

Inventor
Victor C. Heybourne
By Edwin O. Blodgett
Attorney

July 6, 1943. V. C. HEYBOURNE 2,323,600
DOCUMENT PHOTOGRAPHING CAMERA
Filed July 3, 1940 4 Sheets-Sheet 2
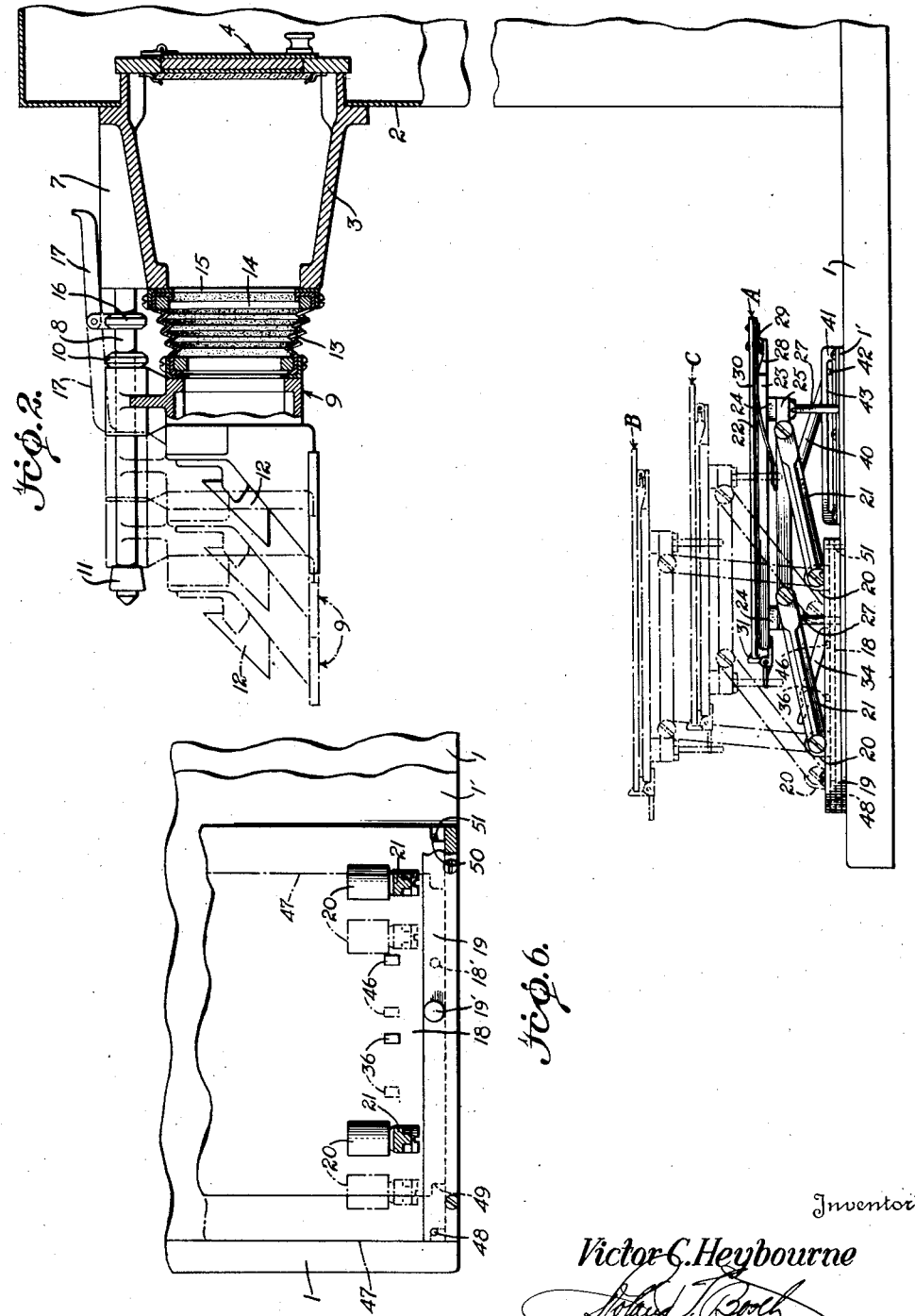
Inventor
Victor C. Heybourne

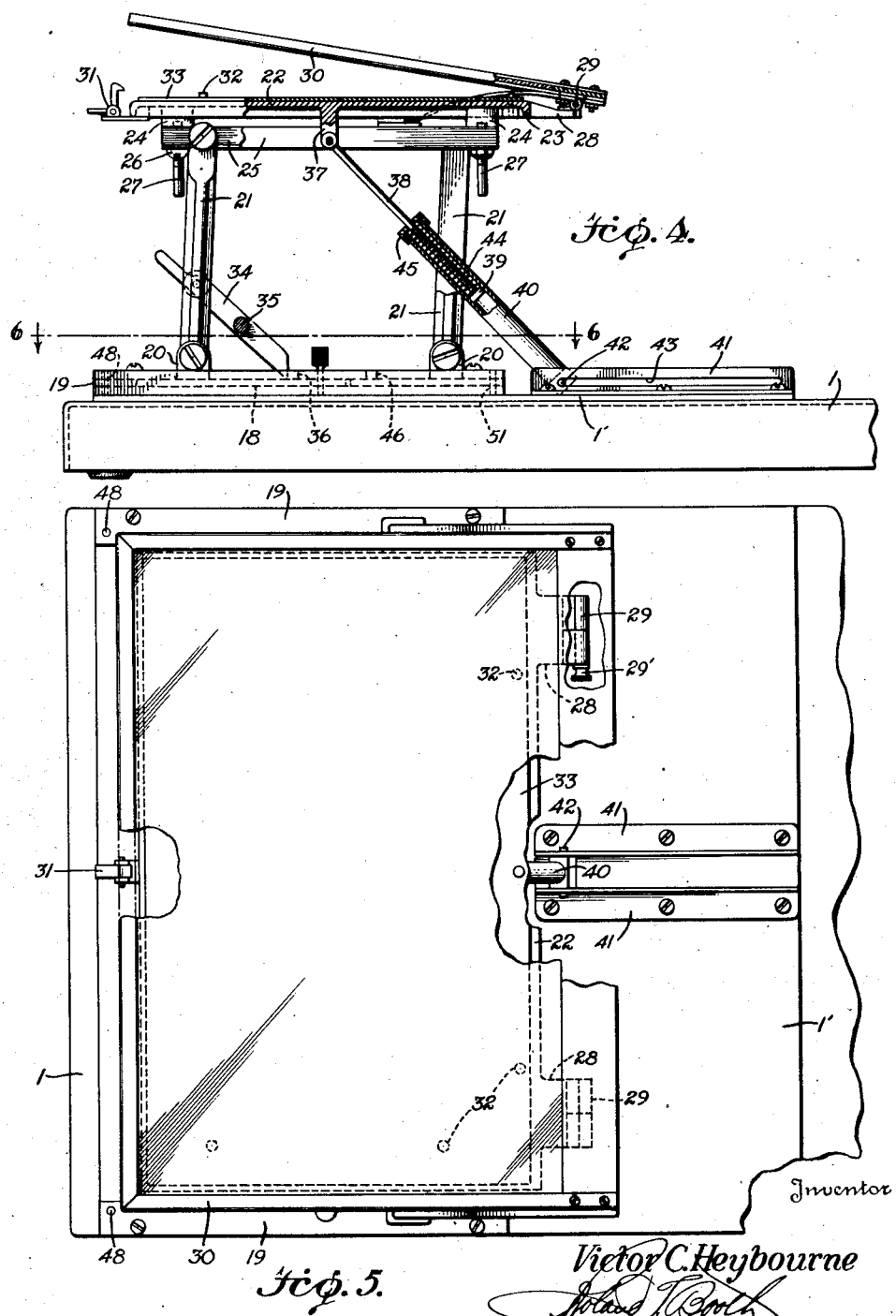

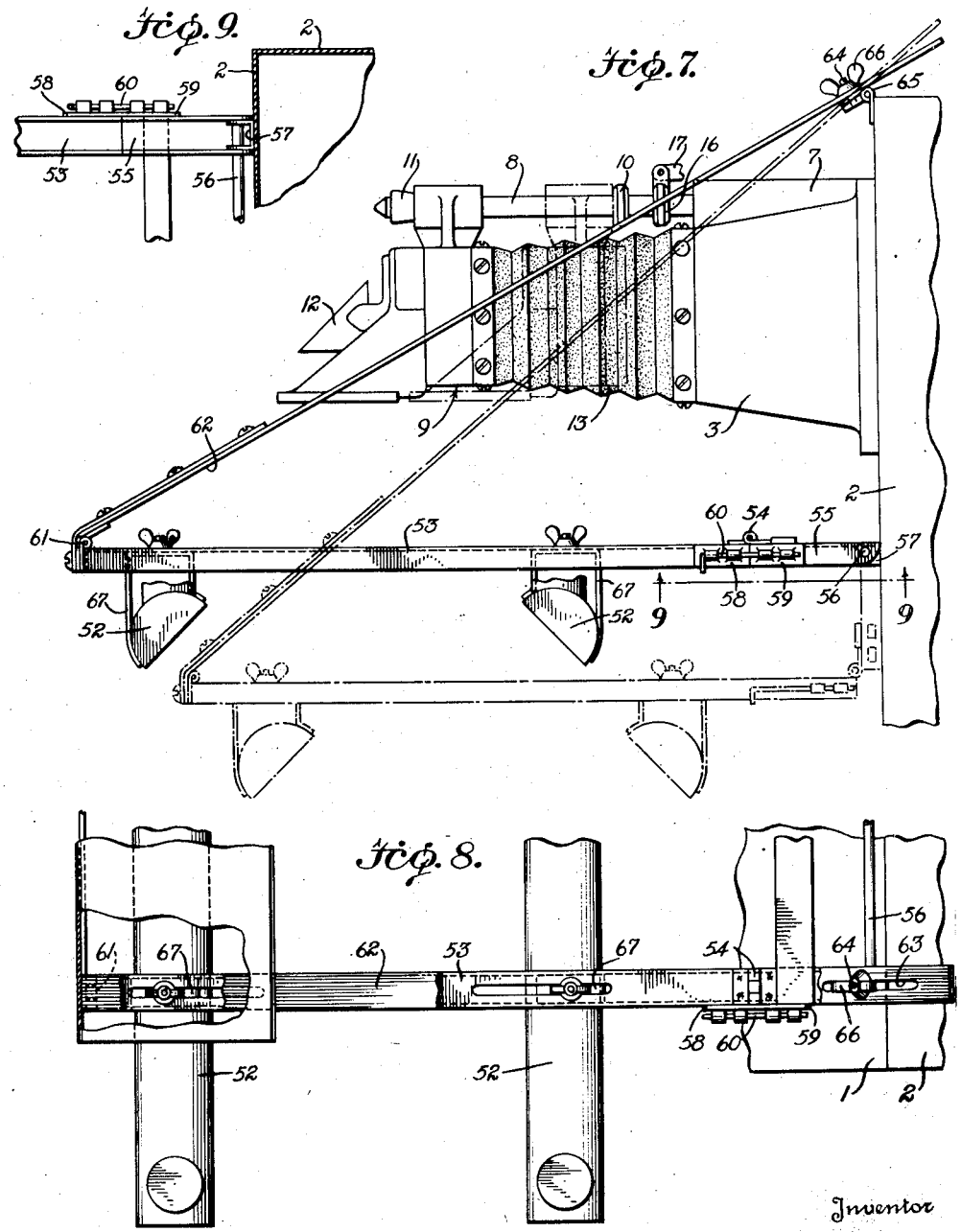

Patented July 6, 1943

2,323,600

UNITED STATES PATENT OFFICE 2,323,600

DOCUMENT PHOTOGRAPHING CAMERA

Victor C. Heybourne, Tonawanda, N. Y., assignor to Remington Rand Inc., Buffalo, N. Y.

Application July 3, 1940, Serial No. 343,803

15 Claims. (Cl. 88—24)

This invention relates to cameras for photographing documents.

The invention comprehends the provision of means for making fixed adjustments of the focusing mechanism, the copyholder and the lights in a document photographing camera so that documents of different size may be reproduced in uniform size or different size, as desired.

The invention provides an improved camera construction wherein the photographic unit is slidably mounted for movement into engagement with any one of a plurality of stops arranged to arrest the motion thereof at a predetermined focusing position for photographically reproducing documents carried by a copyholder adjusted to a position corresponding to the photographic unit so the document may be quickly positioned and held in focus.

The present invention is an improvement over the camera disclosed in Patent No. 2,042,005, patented May 26, 1936. The improvements provide an adjustable mounting for the photographic unit on the tubular member projecting from the housing, and an adjustable copyholder mounted on the camera base arranged for adjustment into two or more different planes in laterally spaced relation in order that documents of different size may be photographed in different corresponding positions of adjustment of the photographic unit and copyholder.

The invention provides an improvement in copyholders having a copyholder plate mounted on a carrying plate through the medium of a plurality of pairs of links pivoted at their opposite ends to the respective plates to provide for parallel movement of the copyholder plate relative to the carrying plate with means for securing the copyholder plate in any one of a series of fixed positions of adjustment relative to the carrying plate. The carrying plate is mounted to shift on the base for positioning the copyholder plate in proper alignment with the photographic unit.

The invention also comprehends the provision of a light supporting structure that may be quickly operated for moving the lights for photographing a document into different positions corresponding to the positions of the photographing unit for obtaining the desired uniform light intensity but eliminating reflection of the incident rays into the photographing unit.

In the drawings:

Fig. 2 is an enlarged side elevation with portions broken away and shown in cross section illustrating details of construction and showing the copyholder and photographic unit in full lines in one position and in dot-and-dash lines in the other positions to which they may be adjusted for making photographic copies of documents, the light supporting structure being omitted.

Fig. 4 is a side elevation of the copyholder on an enlarged scale with portions broken away and shown in section, it being in the raised position as illustrated in Fig. 3.

Fig. 5 is a plan view of the copyholder.

Fig. 6 is a cross section taken on line 6—6 of Fig. 4, showing a fragmentary portion of the copyholder.

Fig. 7 is an enlarged side elevation of a portion of the camera showing the frame structure carrying the lighting means in one position in full lines and in adjusted position in dot and dash lines.

Fig. 8 is a plan view of one side of the light supporting frame as shown in Fig. 7 with portions broken away.

Fig. 9 is a cross section taken on line 9—9 of Fig. 7.

Figures 1, 3:
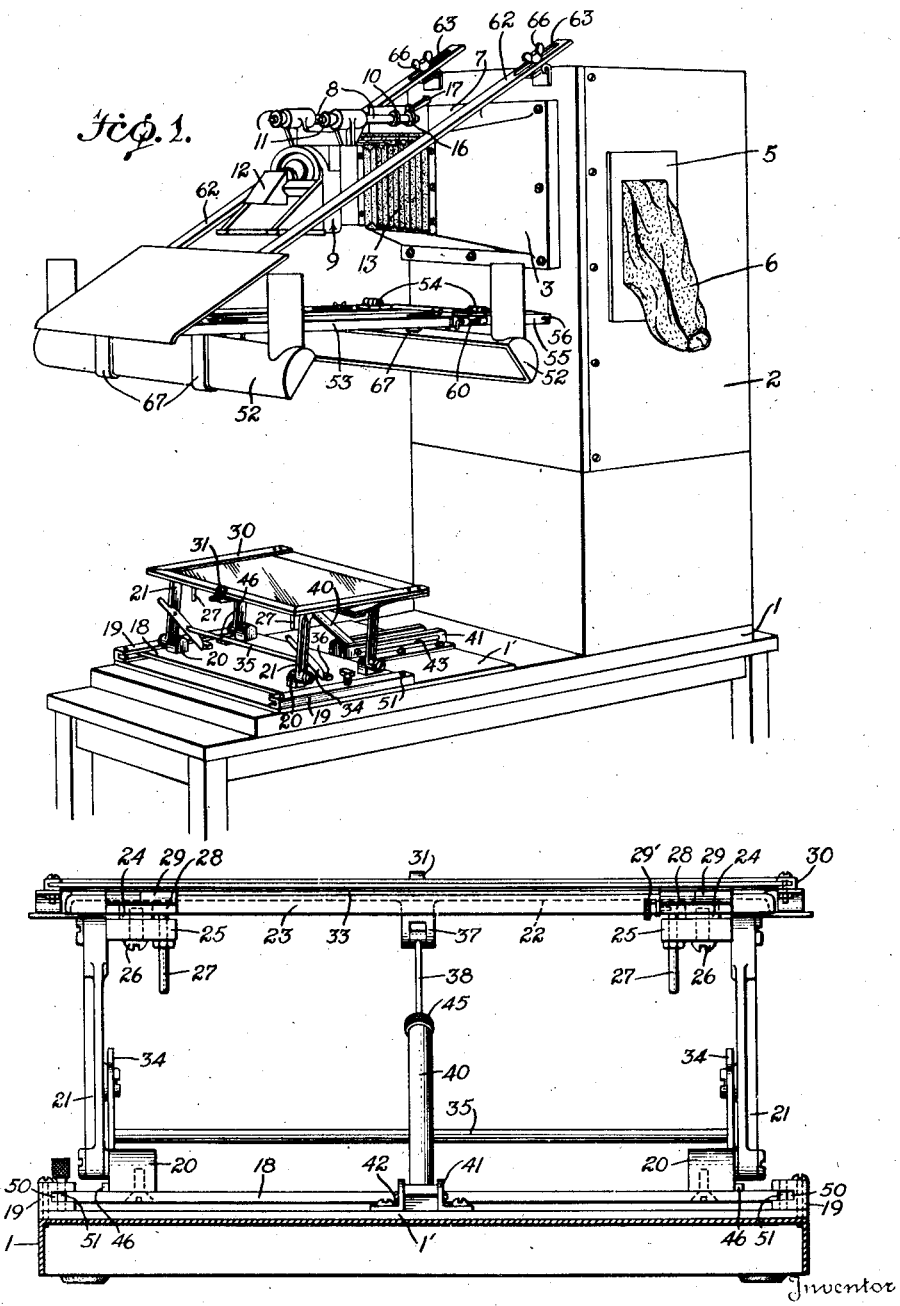
Fig. 1 shows the camera mounted on a table, in perspective.
Fig. 3 is an enlarged rear elevation of the copyholder in its elevated position as shown in dot-and-dash lines in Fig. 2, and as it would appear in looking at it from a position to the right thereof, as illustrated in Fig. 2.

The camera has a base 1 on one end of which is mounted a housing 2 as shown in Figs. 1 and 2. These parts may preferably be constructed in the manner described and shown in the aforementioned patent.

A supporting tube 3 is mounted on casing 2 at the upper end of one side wall thereof and projects over the free end of base 1. Supporting tube 3 extends through an opening in casing 2 and supports a holding frame 4 on the inner end within casing 2 that may be constructed and mounted in the manner disclosed in the abovementioned patent.

Holding frame 4 includes a glass plate against which the sensitized sheets for making duplicate copies are mounted and held during the photographing operation. Housing 2 is provided for the purpose of housing a supply of sensitized sheets that may be placed in frame 4 in photographing documents. Housing 2 is light tight and access is provided to the housing for handling sensitized paper to place it in frame 4 and remove it therefrom after being photographed, through the medium of a door 5 mounted in a side wall of casing 2. Door 5 is provided with a flexible sleeve 6 to receive the arm of an operator in such a manner that light will not be admitted to the interior of casing 2 during the operation of the camera.

Supporting tube 3 is constructed in the manner referred to in the aforementioned patent and frame 4 is mounted on the end of the tube as described in the aforementioned patent so that the sensitized surface of paper sheets on which duplicate photographic copies are to be made are held in the focal plane of the photographic unit.

Supporting tube 3 is provided with a projection 7, not shown in the above mentioned patent, carrying a pair of spaced parallel rods 8 extending over the free end of base 1 beyond the end of supporting tube 3 for slidably supporting photographing unit 9. A stop collar 10 is mounted on each rod 8 for limiting the sliding movement of photographic unit 9 toward housing 2 whereby it is positioned in focus against stop collar 10 for making a photographic reproduction of a document recorded by the copyholder on base 1, in a manner to be described.

The opposite ends of rod 8 are provided with adjustable end caps 11 forming stops to limit the movement of photographic unit 9 in a second position for focusing a document on sensitized paper carried by holder 4, the size of the photographic reproduction of the document when the photographic unit is in this position being different from that produced when photographic unit 9 is engaged with collars 10.

Photographic unit 9 includes a housing structure that mounts the prism 12 for reflecting light from the document through the lens and shutter mechanism carried by the unit for focusing upon the surface of sensitized paper carried in holder 4.

A tubular bellows 13 is secured at opposite ends to supporting tube 3 and photographic unit 9, respectively. For the purpose of securing bellows 13 to tubular support 3, a rectangular frame 14 the size of the free end of tube 3 is positioned inside the end of bellows 13 with the end folded about the outer surfaces thereof as illustrated in Fig. 2. This frame 14 is then inserted into an angular channel frame member 15 mounted on the forward free end of supporting tube 3 and frames 14 and 15 are then suitably secured together so as to clamp the end of bellows 13 firmly therein by means of screws, bolts or the like. The opposite end of bellows 13 is secured to photographic unit 9 in the same manner.

Photographic unit 9 may be adjusted to a third position on rods 8, intermediate the ends of the rods through the provision of collars 16 mounted on rods 8 carrying pivoted stops 17 shown in inoperative position in full lines in Fig. 2 and in operative position in dot-and-dash lines. In operative position pivoted stops 17 have the ends resting on the upper portions of the surface of rods 8. Photographic unit 9 may be moved into engagement with the ends of the pivoted stops for positioning said unit in an intermediate focusing position between the two positions at the ends of the rods as above described.

Documents to be photographed are held by a copyholder mounted on the free end of base 1. This copyholder includes a carrying plate 18 slidably mounted at opposite ends in guides 19 secured in spaced parallel relation on base plate 1' secured to base 1. Guides 19 are longer than carrier plate 18 as shown in Fig. 6.

Carrier plate 18 is provided with a plurality of bearing projections 20, two being provided at each end of the plate for receiving and pivotally mounting the lower ends of two pairs of links 21.

A copyholder plate 22 has a depending flange 23 and a plurality of depending bosses 24 formed on the underside in the corner portions thereof. A pair of bars 25 is secured at each side of the copy plate to a pair of the bosses 24 by means of bolts 26.

Bars 25 are arranged to receive the pivotal connection with the upper ends of links 21 so that copyholder plate 22 is supported for movement in parallel relation to carrier plate 18 and base 1 and is also arranged so that it will hold a document for photographing in the proper focusing plane of the photographic unit. Supporting feet 27 are secured to bars 25 for engaging base 1 to support copyholder plate 22 in one position on links 21.

The rear side of copyholder plate 22 has projections 28 formed thereon and projecting outwardly from flange 23 as clearly shown in Figs. 4 and 5 for receiving and mounting hinge members 29 supporting hinge frame 30 carrying a glass plate adapted to hold documents to be copied in flat relation on copyholder plate 22. A suitable form of latch 31 is provided on the opposite side of copyholder plate 22 for engaging the free edge of frame 30 to hold it in position to press a copy flat against copyholder plate 22. A retaining screw 29' operates to keep hinge members 29 engaged and when removed provides for the detachment of frame 30 from projections 28.

Suitable copy positioning pins 32 are mounted on copyholder plate 22 in a manner clearly described in the aforementioned patent and a copy receiving plate 33 may be used on top of copyholder plate 22 when desired for the purpose of supporting unusually thin sheets to be copied as well as to provide a background or margin for any documents being copied. Plate 33 is provided with a plurality of openings to receive pins 32 for holding plate 33 in position on copyholder plate 22.

Supporting feet 27 are adjustably mounted on bars 25 to provide for the support of copyholder plate 22 on carrying plate 18 and base 1 in the proper position for photographing documents when photographic unit 9 is engaged with collars 10. This position is obtained not only through the support of copyholder plate 22 by supporting feet 27 but with the cooperation of links 21 and the slidable movement of copyholder plate 18 to the rearmost position in guides 19 as shown in full lines in Figs. 2 and 6.

When it is desired to change the size of the reproduction of the document being photographed from that obtained when the copyholder is in its lowered position supported on feet 27 which will be hereinafter referred to as position "A," the copyholder plate is moved upon links 21 to a position where the links are substantially vertical as shown in Figs. 2 and 4 and indicated as position "B." In this position copyholder plate 22 is in parallel relation to its position "A," but is offset with respect to position "A," so as to be nearer photographic unit 9 and moved laterally toward the free end of base 1. Photographic unit 9 is then moved along rods 8 to engage end caps 11. This positions the lens unit and copyholder for focusing a document carried on the copyholder plate 22 on sensitized film or paper carried in frame 4.

In order to support copyholder plate 22 in position "B", a pair of latches 34 are pivotally mounted on links 21 at opposite sides of copyholder plate 22 adjacent the end of base 1. These latches are connected by a bar 35. The ends of latches 34 are formed to engage abutments 36 on carrying plate 18 arranged to cooperate with links 21 to support copyholder plate 22 in the proper position for photographing documents, designated as position "B".

The central portion of copyholder plate 22 is formed with a depending boss 37 having a piston rod 38 pivotally connected thereto at one end and provided with a piston 39 at its opposite end slidably engaging in cylinder 40. Cylinder 40 is slidably mounted in brackets 41 carried by base plate 1' by means of a cross pin 42 engaging in slots 43 in said brackets 41. A compression spring 44 is arranged between piston 39 and cap 45 on the free end of cylinder 40 for normally urging piston 39 toward the closed end of cylinder 40.

This structure normally operates to pull copyholder plate 22 in one direction so as to move it toward position "A". This structure operates when copyholder plate 22 is in position "B" to cause latches 34 to firmly engage abutments 36 for firmly holding copyholder plate 22 in position "B". The operation of piston 39 and cylinder 40 also aids to prevent too rapid movement of copyholder plate 22 from one position to the other by its dash pot action. An adjustable vent, not shown, may be provided on cylinder 40 for controlling the rapidity of the dash pot action, if desired.

Positions "A" and "B" and the lengths of links 21 together with the position of carrying plate 18 for the two positions of copyholder plate 22 with photographic unit 9 can be readily calculated in a manner well known to one skilled in the art so that it is only necessary to swing copyholder plate 22 from position "A" to position "B" and vice versa, for obtaining either of two sizes of photographic copies of a document or uniformed size reproductions of two different sizes of documents. Obviously, the photographic unit will be adjusted back and forth on rods 8 for these two positions of copyholder plate 22.

It is also desirable to provide means for adjusting photographic unit 9 and copyholder plate 22 to a third position between positions "A" and "B" for obtaining the photographic copying of documents at a different ratio of photographic reduction than for positions "A" and "B". It is found, however, that with copyholder plate 22 mounted on levers 21 as above described the positioning of copyholder plate 22 intermediate positions "A" and "B" on links 21 will not support it in the proper plane so that it can be placed in a proper focusing position with photographic unit 9. It has, therefore, been found necessary for any intermediate position of copyholder plate 22 between positions "A" and "B" to move carrying plate 18 in guides 19 for obtaining the proper positioning of copyholder plate 22 to hold a document in focus with photographic unit 9.

The intermediate position of photographic unit 9 has been described above, in which it will be moved into a position on rods 8 where the rear end of the photographic unit will engage the ends of stops 17. Copyholder plate 22 may then be moved to an intermediate position identified as position "C" in Fig. 2, by moving it upon links 21 until the ends of latches 34 engage abutments 46 mounted on base plate 1'. Then the copyholder plate and carrying plate 18 are slidably moved toward the free end of base 1 to the position indicated in dot-and-dash lines in Fig. 6 at 47. This position of carrying plate 19 is determined by calculation and stop pins 48 are arranged in guides 19 so as to engage in the corner recesses 49 at the corners of plate 18. In this way copyholder plate 22 will be supported in the proper focal position with photographic unit 9 in its intermediate position against stops 17 for photographing documents held thereon and indicated as position "C".

The opposite ends of carrying plate 18 are formed with corner recesses 50 and stop pins 51 are mounted in the rear ends of guides 19 for stopping the slidable movement of carrying plate 18 in supporting copyholder plate 22 in positions "A" and "B". Spring 44 with the piston and cylinder arrangement above described will operate to hold latches 34 engaged with abutments 46 in position "C", as well as position "B", and brackets 41 and slots 43 therein are formed to provide for the convenient operation of this spring and dash pot structure in obtaining the movement of copyholder plate 22 into its various positions.

A retaining pin 19' is detachably engaged in openings in guide 19 for engaging in either one of two openings 18' in plate 18 for holding plate 18 in either of its adjusted positions.

With the three positions of copyholder plate 22 and photographic unit 9 as above described, it will be understood that three different sizes of documents may be photographically reproduced on a uniform size of sensitized film or paper positioned in frame 4. Alternately, a uniform size of document may be photographically reproduced in three different sizes whenever this is found desirable.

Suitable means for illuminating documents on copyholder plate 22 are provided as shown in Fig. 1. Lamp housings 52 are provided for supporting vapor type tubular lamp structures of a character well known in the art to provide illumination of copyholder plate 22. Each housing 52 is arranged so that the light is reflected thereby downwardly toward the copyholder in such a way that the light is reflected by documents on the copyholder toward the photographing unit for photographing. Each lamp housing 52 is slidably mounted on rails 53.

Rails 53 forming a substantially horizontal supporting frame are hingedly mounted at 54 on sections 55 pivotally mounted on rod 56 carried by bracket 57 secured on housing 2 below tubular member 3, as shown in Fig. 7. Brackets 58 and 59 are carried by rails 53 and sections 55 respectively. These brackets are provided with aligned projections formed with openings to receive pins 60 for holding sections 55 in alignment with rails 53 as shown in full lines in Fig. 7.

The opposite ends of rail 53 are provided with hinged connections 61 to straps 62. Each strap 62 extends upwardly in inclined relation from the outer ends of rails 53 to the upper end of housing 2 where they are provided with longitudinal slots 63 for receiving threaded bolts 64 carried by hinge brackets 65 mounted on the upper end of housing 2. A wing nut 66 threaded on each bolt 64 is adapted for manual operation to clamp the free ends of straps 62 against movement relative thereto for supporting the outer ends of rails 53 in horizontal position and in alignment with sections 55 in the manner shown in full lines in Fig. 7. This position of the lamp supporting structure is employed when photographs of documents are taken with the copyholder in positions "B" and "C."

When the copyholder is in position "A," pins 60 are removed from brackets 58 and 59 and wing nuts 64 are actuated to release straps 62 so that rails 53 and sections 55 may have hinging movement relative to each other into the position shown in dot and dash lines in Fig. 7 wherein sections 55 extend downwardly from supporting brackets 57 along the front face of housing 2. This lowers the position of rails 53 which are then supported in horizontal position by adjustment of straps 62 and the tightening of thumb screws 66 on bolts 64. This brings the lights in light housing 52 into a position where they are substantially the same distance from the copyholder plate as they are when it is supported in the elevated position shown in full lines in Fig. 7 for positions "B" and "C." In this way substantial uniformity of the light intensity directed on the documents to be photographed is obtained. Suitable brackets 67 are used to suspend each light housing 52 from rails 53 and are provided with wing nuts for securing light housings 52 in any position of adjustment on rail 53 between the ends of the slots that receive the supporting portions of the brackets, as clearly shown in Figs. 7 and 8 of the drawings.

With this arrangement of adjustable photographic units, copyholder and light support, it will be seen that uniform intensity of lighting is obtained for each position of adjustment of the copyholder and the photographic unit so that uniform size reproductions may be made of several different sizes of documents or one document may be reproduced to provide three different sized copies. The operation of the photographic unit, copyholder and light supporting structure is so arranged that the adjustments are fixed for immediate manual operation of the several parts into any one of their positions of adjustment in a quick and convenient manner without using gauges.

The structure described provides for the mounting of the photographic unit and light supporting structure above the base on the housing so that the space around the copyholder is open and free for the operator to conveniently manipulate the documents to be copied and have ready access to all of the camera mechanism for convenient operation.

The invention claimed is:

1. A document photographing camera comprising a base, a casing mounted on one end of the base, a supporting tube mounted at one end on one side of the casing and extending over the other end of the base, supporting means on said tube projecting beyond the free end thereof over said base, a photographic unit slidable axially of said tube on said supporting means into either of a plurality of predetermined positions, a flexible tubular member connecting the end of said supporting tube and said photographic unit, holding means in said casing at the end of said tube for holding a sensitized sheet in position for coopperation with said photographic unit, a copyholder plate for holding a document to be photographed, pivoted links connected to said copyholder plate at one end and said base at the other and movably supporting said copyholder plate on said base in parallel relation to the axis of said tube, and means for retaining said copyholder in either of a plurality of positions of movement on said links relative to said base, each position corresponding to one of the positions of said photographic unit whereby a document will be held in focus with said photographic unit in each of said positions.

2. A document photographing camera comprising a base, a casing mounted on one end of said base, a supporting tube mounted at one end on one side of said casing and having the free end projecting over the other end of said base, a sensitized sheet holder at the end of said tube in said casing, a supporting member secured to a side portion of said tube at one end and having the opposite end extending beyond the end of said tube in parallel relation to the axis of the tube, said member having spaced stops thereon, a photographic unit slidably mounted on said supporting member for movement to engage each of said stops, said unit having coaxial relation with said tube, a flexible tube connecting said unit and said tube, a copy supporting plate, and means movably supporting and guiding said plate on said base for movement into either of several predetermined positions spaced at different vertical distances from said base and different horizontal distances from said casing for supporting copy for photographing in the focal plane of said photographic unit in each position thereof.

3. A document photographing camera comprising a base, a casing mounted on one end thereof, a supporting tube mounted at one end on one side of said casing in spaced relation above said base and having the free end projecting over the other end of said base, a sensitized sheet holder in the casing at the end of said tube, a photographic unit mounted beyond the free end of said tube in axial alignment therewith and adjustable axially of said tube into a plurality of predetermined positions, a copyholder plate above the free end of said base parallel to said tube axis, and a plurality of links pivoted at one end to said plate and to the base at the opposite end and mounting said copyholder plate for parallel movement into a plurality of positions at different distances from said base but aligned with said photographing unit in each position thereof for holding a document for photographing in each position whereby the photograph taken in one position will have a different size relative to the object photographed than the photograph taken in the other positions.

4. A document photographing camera comprising a base, a casing mounted on one end thereof, a supporting tube mounted at one end on one side of said casing in spaced relation above said base and having the free end projecting over the other end of said base, a sensitized sheet holder in the casing aligned with said tube, a photographic unit mounted on said tube beyond the free end thereof in axial alignment therewith and adjustable axially of said tube into a plurality of predetermined positions, a copyholder plate above the free end of said base parallel to said tube axis, and means attaching said copyholder plate to the free end of said base for movement on and controlled by said means in parallel relation toward and from said base and longitudinally relative thereto for supporting documents to be photographed in focus with said photographic unit in any of said positions of adjustment thereof.

5. A document photographing camera comprising a base, a casing mounted on one end thereof, a supporting tube mounted at one end on one side of said casing in spaced relation above said base and having the free end projecting over the other end of said base, a sensitized sheet holder in the casing aligned with said tube, a photographic unit mounted on said tube beyond the free end thereof in axial alignment therewith and adjustable axially of said tube into a plurality of predetermined positions, a copyholder plate above the free end of said base parallel to said tube axis, means supporting said copyholder plate on the free end of said base below said photographic unit for adjustment vertically and horizontally on said base into positions corresponding to adjusted positions of said photographic unit, lighting means for documents carried by said copyholder plate, and a frame carrying said lighting means mounted on said casing adjacent said supporting tube and extending over the free end of said base, said frame being adjustable relative to said base for raising, lowering and longitudinally adjusting said lighting means to a predetermined number of fixed positions corresponding to the different positions of said copyholder plate and photographic unit to maintain substantially uniform light intensity on documents carried by said copyholder plate in each position thereof.

6. A document photographing camera comprising a base, a casing mounted on one end thereof, a supporting tube mounted at one end on one side of said casing in spaced relation above said base and having the free end projecting over the other end of said base, a sensitized sheet holder in the casing at the end of said tube, a photographic unit mounted beyond the free end of said tube in axial alignment therewith and adjustable axially of said tube into a plurality of predetermined positions, a copyholder plate above the free end of said base parallel to said tube axis, a plurality of links pivoted at one end to said plate and to the base at the opposite end and mounting said copyholder plate for parallel movement into a plurality of positions at different distances from said base but aligned with said photographing unit in each position thereof, supporting feet on said copyholder plate for engaging and seating on said base to support said plate in the lower position, and a latch cooperating with said levers for holding said plate in an upper position, whereby a document may be photographed in each position of said plate, the size of the photographs being different for each position.

7. In a document photographing camera having a base with photographing means mounted on one end and an adjustable photographing unit carried thereby and overhanging the other end of said base, a copyholder plate mounted over the last-mentioned end of the base in substantially parallel relation and having a plurality of links pivotally connected thereto at one end and to the base at the other end and mounting said plate for parallel and longitudinal movement relative to said base into positions at different distances from said base, supporting feet on said plate for engaging the base in one position of said plate for supporting it, and a latch pivoted on one of said links for engaging an abutment on the base to retain said plate in the other position.

8. A copyholder for document photographing cameras having means requiring the positioning of documents in different planes in spaced offset relation to one another for producing photographic copies of uniform size from documents of different size, comprising a carrying plate, a copyholding plate, pairs of links pivoted at one end to each side of said copyholder plate and at the other end to corresponding sides of the carrying plate and mounting said copyholder plate for parallel movement relative to said carrying plate, and means for retaining said copyholder plate in any one of a plurality of positions relative to said carrying plate.

9. A copyholder for document photographing cameras having means requiring the positioning of documents in different planes in spaced offset relation to one another for producing photographic copies of uniform size from documents of different size, comprising a carrying plate, a copyholder plate, pairs of links pivoted at one end to each side of said copyholder plate and at the other end to corresponding sides of the carrying plate and mounting said copyholder plate for parallel movement relative to said carrying plate, latch means for retaining said copyholder plate in one position, and supporting feet on said copyholder plate for supporting it in another position.

10. A copyholder for document photographing cameras having means requiring the positioning of documents in different planes in spaced offset relation to one another for producing photographic copies of uniform size from documents of different size, comprising a carrying plate, a copyholder plate, pairs of links pivoted at one end to each side of said copyholder plate and at the other end to corresponding sides of the carrying plate and mounting said copyholder plate for parallel movement relative to said carrying plate, latch means for retaining said copyholder plate in one position, supporting feet on one of said plates for supporting said copyholder plate in another position, and means for retarding too rapid movement of said copyholder plate in its movement from one position to another on said links.

11. A copyholder for document photographing cameras having means requiring the positioning of documents in different planes in spaced offset relation to one another for producing photographic copies of uniform size from documents of different size, comprising a carrying plate, a copyholder plate, pairs of links pivoted at one end to each side of said copyholder plate and at the other end to corresponding sides of the carrying plate and mounting said copyholder plate for parallel movement relative to said carrying plate, latch means for retaining said copyholder plate in one position, supporting feet on said copyholder plate for supporting it in another position, and a retarding device having a cylinder and a piston slidable in said cylinder, means pivotally connecting the piston to one plate, and means pivotally and slidably connecting the cylinder to parts associated with the other plate whereby the movement of the copyholder plate between supported positions is cushioned.

12. A copyholder for document photographing cameras having means requiring the positioning of documents in different planes in spaced offset relation to one another and adapted for producing photographic copies of uniform size from documents of different size, comprising a carrying plate, a copyholder plate, a pair of bars secured to said copyholder plate in spaced parallel relation, pairs of links pivotally secured to said pair of bars at one end and at the other end to said carrying plate, supporting feet mounted on said bars for supporting said copyholder plate in one position on said carrying plate, a latch on said levers operable to support said copyholder plate on said levers in another position, and means connected to said copyholder and carrying plates for cushioning the movement of one relative to the other.

13. A copyholder for document photographing cameras having means requiring the positioning of documents in different planes in spaced offset relation to one another in taking pictures of different sizes, comprising a base plate, a carrying plate slidably mounted on said base plate, a copyholder plate, links hinged at opposite ends to said copyholder and carrying plates, respectively, and mounting said copyholder plate for parallel movement relative to and toward and from said carrying plate, and means for retaining said carrying and copyholder plates selectively in predetermined positions relative to said base plate corresponding to the positions of an adjustable photographic means adapted for taking different sized pictures of the same document in the different positions of said copyholder plate.

14. A copyholder for document photographing cameras having means requiring the positioning of documents in different planes in spaced offset relation to one another, comprising a pair of spaced parallel guides, a carrying plate slidable in said guides, stops in said guides limiting sliding movement in opposite directions, a copyholder plate, links pivotally connected at opposite ends to said copyholder and carrying plates, respectively, and mounting said copyholder plate for parallel movement relative to said carrying plate on said links, and latch means for retaining said copyholder plate in selected positions of adjustment on said carrying plate, and said carrying plate being slid in said guides to engage one of said stops for cooperation in positioning a document on said copyholder plate in focus in each position.

15. A copyholder for document photographing cameras having means requiring the positioning of documents in different planes in spaced offset relation to one another, comprising a pair of spaced parallel guides, a carrying plate slidable in said guides, means for retaining said plate in a plurality of different fixed positions in said guides, a copyholder plate, links pivotally connected at opposite ends to said copyholder and carrying plates respectively, and mounting said copyholder plate for parallel movement relative to said carrying plate on said links, and latch means for retaining said copyholder plate and links in selected positions of adjustment on said carrying plate, whereby a document supported on said copyholder plate will be held in focus for photographing in a plurality of different positions.

VICTOR C. HEYBOURNE.